US006951051B2

(12) United States Patent
Wynn, Jr.

(10) Patent No.: US 6,951,051 B2
(45) Date of Patent: Oct. 4, 2005

(54) FUEL DAMPER REMOVAL TOOL

(75) Inventor: James Archie Wynn, Jr., Virginia Beach, VA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 10/101,334

(22) Filed: Mar. 20, 2002

(65) Prior Publication Data

US 2002/0095758 A1 Jul. 25, 2002

Related U.S. Application Data

(62) Division of application No. 09/564,854, filed on May 4, 2000, now Pat. No. 6,715,193.

(51) Int. Cl.[7] .................................................. F16L 35/00

(52) U.S. Cl. ........................... 29/426.5; 29/239; 29/268

(58) Field of Search .......................... 29/239, 268, 272, 29/293.56, 237, 426.5, 229; 269/43; 254/18

(56) References Cited

U.S. PATENT DOCUMENTS 3,062,501 A * 11/1962 Nelson ........................ 254/18
3,197,848 A * 8/1965 Eichacker .................... 29/268
4,893,393 A * 1/1990 Marshall ...................... 269/43
6,032,651 A 3/2000 Field

* cited by examiner

*Primary Examiner*—Robert C. Watson

(57) ABSTRACT

A tool is provided for removing a component from a fuel rail in an automotive fuel system. The tool has a pair of jaws connected to a pair of pivoting handles, which allow the jaws to be opened and closed. The jaws have an inner cavity shaped to conform to an outer surface of the component. A pair of release members are slidably mounted on an outer surface of the jaws. When the release members are moved relative to the jaws, rims on the release members contact a retention clip holding the component to the fuel rail. Contact between the rims and the clip causes the clip to disengage from a retention surface on the fuel rail, freeing the component.

11 Claims, 8 Drawing Sheets

Figure 5A
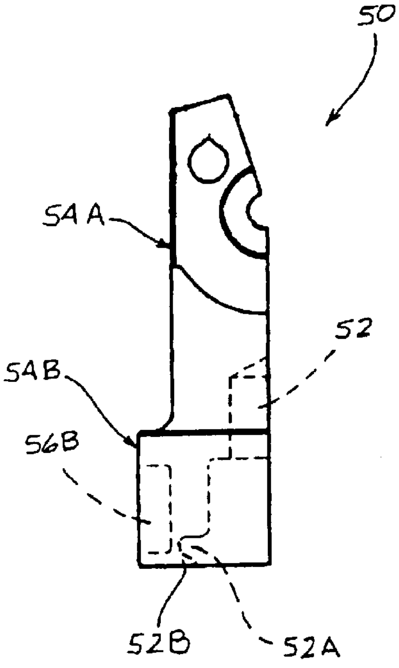
Figure 5B
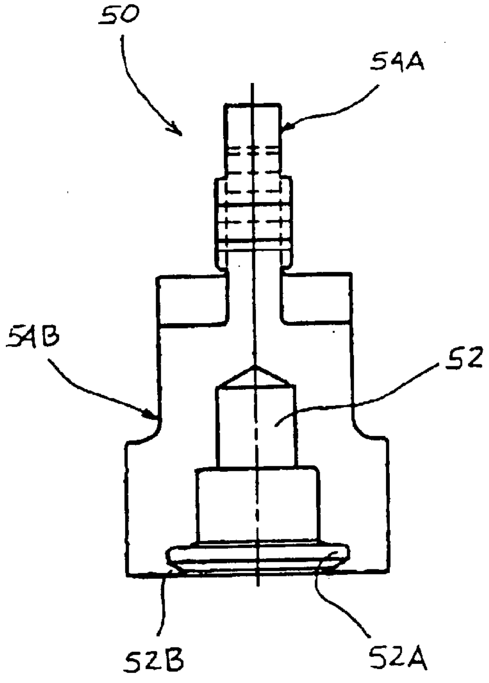
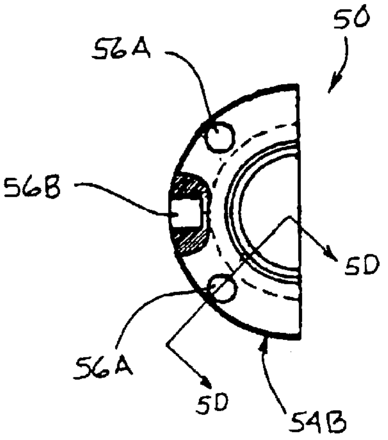
Figure 5C
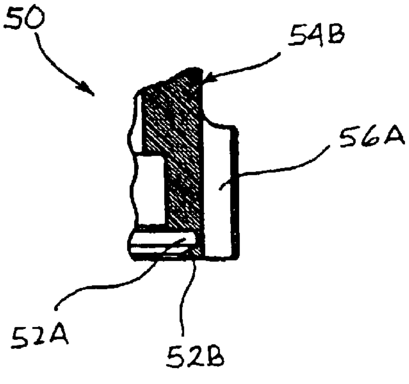
Figure 5D

FUEL DAMPER REMOVAL TOOL

CROSS-REFERENCE TO RELATED APPLICATIONS

The present application is a divisional application filed pursuant to 35 U.S.C. §§120 and 121 and claims the benefits of prior application Ser. No. 09/564,854 filed May 4, 2000, now U.S. Pat. No. 6,715,193 which is herein incorporated by reference in its entirety.

FIELD OF THE INVENTION

This invention relates to a tool for removing a fuel damper or a fuel regulator from a fuel rail in an automotive fuel system.

BACKGROUND OF THE INVENTION

Fuel delivery systems which employ an in-tank pressure regulator are susceptible to fuel pressure pulsations. These pulsations result from the sequential firing of fuel injectors mounted on the fuel rail. Typically, an energy absorbing device, such as a damper, is mounted on the fuel rail to compensate for the pressure pulsations. A damper of this type is disclosed in commonly-assigned, co-pending U.S. patent application Ser. No. 09/086,084, entitled "Fuel Rail Damper", filed, May 28, 1998, which is incorporated herein in its entirety by reference.

The damper is secured to a fuel cavity, typically a fuel cup, on the fuel rail using a retention clip of the type disclosed in the commonly-assigned, co-pending application identified above. The circular clip is attached to the damper along an outer circumference, and has a number of resilient fingers arranged on an inner circumference. The fingers fit around an upper surface of the fuel cup to securely retain the damper in place on the fuel rail.

Because of the arrangement of the fingers around the inner circumference of the clip, it is very difficult to disengage the clip from the fuel cup with conventional tools. A tool is needed which can disengage the retention clip by forcing all of the resilient fingers out of contact with the fuel cup simultaneously, and allow the damper to be removed.

SUMMARY OF THE INVENTION

The present invention provides a tool for releasing a retention member interposed between a male member and a female member cooperatively receiving the male member. The retention member exerts a retaining force opposing displacement of a first one of the male and female components along a first axis relative to a second one of the male and female components. The tool comprises a set of jaws adapted for gripping the first one of the male and female members; and a set of release members moving parallel to the axis between a first position and a second position. Each one of the set of release members being supported for the parallel movement relative to a corresponding one of the set of jaws, and each one of the set of release members in the second position being adapted for engaging the retention member and exerting a reaction force relieving the retaining force.

The present invention also provides a tool for releasing a retention member exerting a retaining force opposing displacement of at least one of a fuel damper and a fuel regulator along a first axis relative to a mounting cavity. The tool comprises a pair of jaws adapted for cooperatively gripping the at least one of the fuel damper and the fuel regulator, and a pair of release members moving parallel to the axis between a first position and a second position. The pair of jaws including a first jaw pivotally connected to a second jaw, and the first jaw pivoting relative to the second jaw on a second axis oriented orthogonally with respect to the first axis. The pair of release members including a first release member supported for the parallel movement relative to the first jaw and a second release member supported for the parallel movement relative to the second jaw, and each one of the release members in the second position being adapted for engaging the retention member and exerting a reaction force relieving the retaining force.

The present invention additionally provides a method of releasing a retention member securing a component to a fixture. The method comprises providing a set of jaws adapted for gripping the component, providing a set of release members supported for relative movement on the set of jaws, moving the set of release members relative to the set of jaws to releasingly engage the retention member, and separating the component from the fixture.

A lifting ring can be used to move the release members relative to the jaws. Cam grooves on an inner surface of the lifting ring interact with pins mounted on the release members to force the release members axially when the ring is rotated.

Alternatively, a pair of lever arms can be used to move the release members relative to the jaws. The lever arms are pivotally connected to the release members. When the lever arms are pivoted, the release members are forced axially into contact with the retention clip.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

FIGS. 5A, 5B, 5C, and 5D are detail views of a jaw for the tool shown in FIG. 4.

DETAILED DESCRIPTION OF THE PREFERRED EMBODIMENTS

Figure 1:
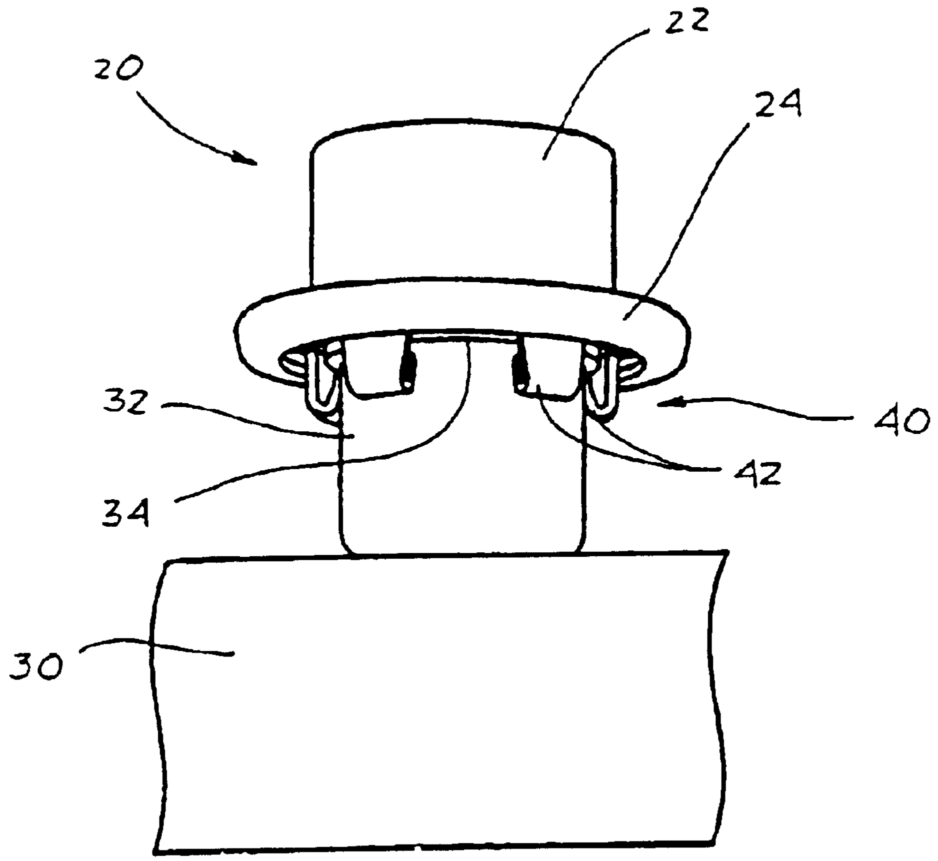
Figure 1 (Prior Art)
FIG. 1 is a perspective view showing a component mounted on a fuel rail.
Figure 2:
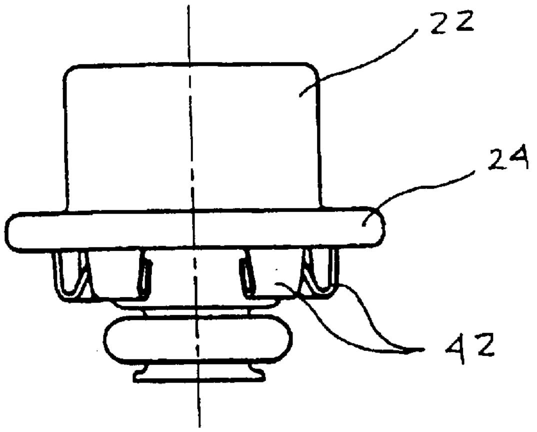
Figure 2 (Prior Art)
FIG. 2 is an elevation view showing an upper housing and a retention clip of the damper.
Figure 3:
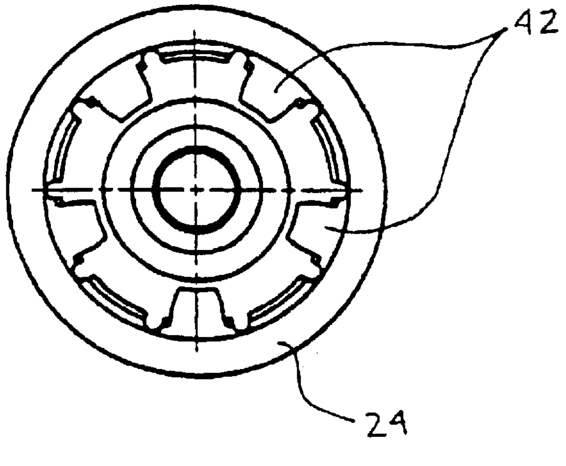
Figure 3 (Prior Art)
FIG. 3 is a plan view of the damper and the retention clip.

FIG. 1 shows a component, e.g., a fuel damper 20 or a fuel regulator, which is secured on a fuel rail 30 with a retention clip 40. As shown in FIG. 2, the damper 20 has an upper housing 22 containing the damper mechanism (not shown). The clip 40 has a support portion on an outer diameter (not shown) and a plurality of resilient fingers 42 on an inner diameter. The support portion of the clip 40 is disposed in a flange 24 of the housing 22, as shown in FIGS. 1, 2, and 3. The resilient fingers 42 extend over a lip 34 on a fixture, e.g., a fuel cup 32, to maintain the damper 20 in place.

Figure 4:
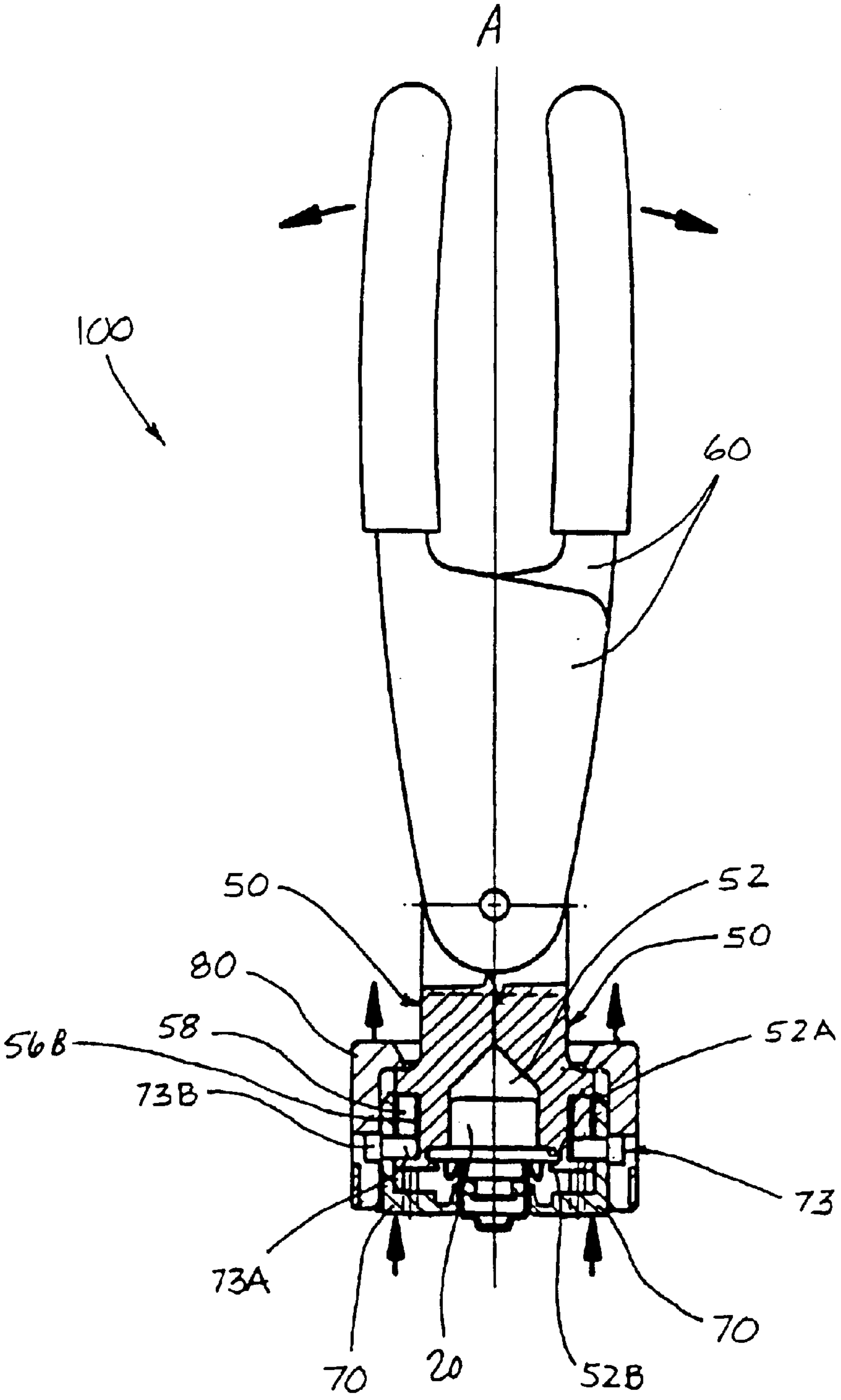
FIG. 4 is a partial cross-section view showing a tool according to the present invention.

FIG. 4 shows a tool 100 according to the present invention. The tool 100 comprises a set of jaws 50 secured to corresponding pivoting handles 60. As it is used herein, the expression "set" refers to one or more substantially similar features that operate in substantially the same manner. A pair of jaws 50 is illustrated in the drawings, however, the present invention is not limited to only two jaws 50. The jaws 50 are symmetrical and are configured to engage an outer surface of the damper 20. Pivoting the handles 60 apart and together causes the jaws 50 to open and close, respectively. The tool 100 has a longitudinal axis A, as shown in FIG. 4.

One of the jaws 50 is shown in FIGS. 5A–5D. As shown, the jaws 50 have an internal cavity 52 with a shape that corresponds to an outer surface of the damper 20. The cavity 52 includes an indentation 52A to accommodate the flange 24 of the damper 20, and an angled lip 52B which fits below the flange 24 to lock the damper 20 in place when the jaws 50 are closed around it. The jaws 50 in this embodiment have a semicircular lateral cross-section and contact the damper 20 around its full circumference. Of course, if there are more than two jaws 50, each jaw 50 can extend around the full circumference an equal distance. Moreover, there may be gaps between adjacent jaws 50 such that there would not be contact with the damper 20 around its full circumference. For example, the jaws 50 can be formed with a narrower, non-circular cross-section, having a smaller area of contact with the damper 20, and still provide adequate locking force on the damper 20.

The jaws 50 have a substantially planar upper portion 54A which attaches to a respective handle 60, and a rounded lower portion 54B. There are a plurality of longitudinal apertures 56A and a longitudinal groove 56B in the rounded lower portion 54B of each jaw.

Figure 6A:
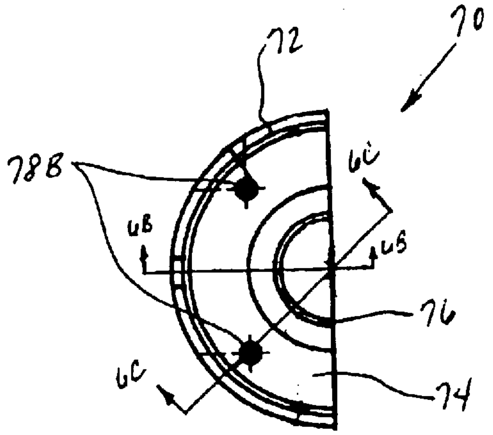
FIGS. 6A, 6B, and 6C are detail views of a release member for the tool shown in FIG. 4.
Figure 6B:
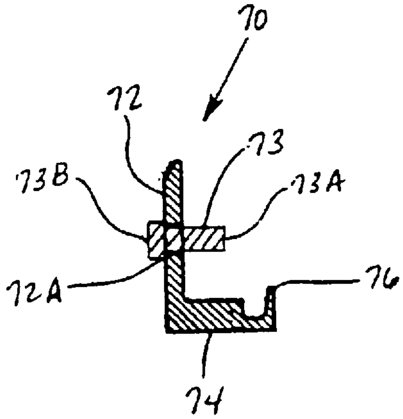
Figure 6C:
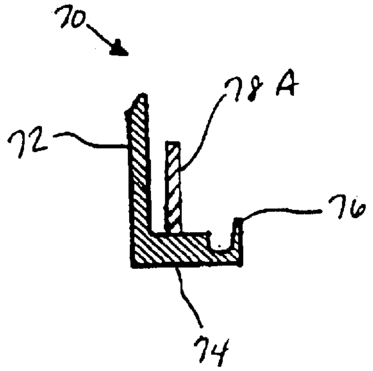

A set of release members 70 are slidably mounted on an outer surface of the jaws 50. Again, as it is used herein, the expression "set" refers to one or more substantially similar features that operate in substantially the same manner. A pair of release members 70 is illustrated in the drawings, however, the present invention is not limited to only two release members 70. As shown in FIGS. 6A–6C, each release member 70 has a semi-circular lateral cross-section, and is formed with an upper flange 72, and a lower flange 74 having an inner rim 76. Of course, if there are more than two release members 70, each release member 70 can extend around an equal portion of the full circumference.

As shown in FIGS. 6A–6C, an inwardly directed radial pin 73 is secured in a radial aperture 72A on the upper flange 72 of each release member 70. The radial pins 73 have a first end 73A and a second end 73B. When the release members 70 are mounted on the jaws 50, first ends 73A of the radial pins 73 are slidably disposed in the longitudinal grooves 56B on the flanges 56 of the jaws 50, as shown in FIG. 4. A slide spring 58 is disposed in the groove 56B in each jaw 50 to bias the radial pins 73, and therefore the release members 70, in an axial direction away from the handles 60.

A plurality of guide pins 78A are mounted in longitudinal apertures 78B on the lower flange 74 of each release member 70. The guide pins 78A are disposed in the longitudinal apertures 56A of the jaw 50, and guide the release members 70 axially while prohibiting rotation of the release members 70 relative to the jaws 50.

Figure 7A:
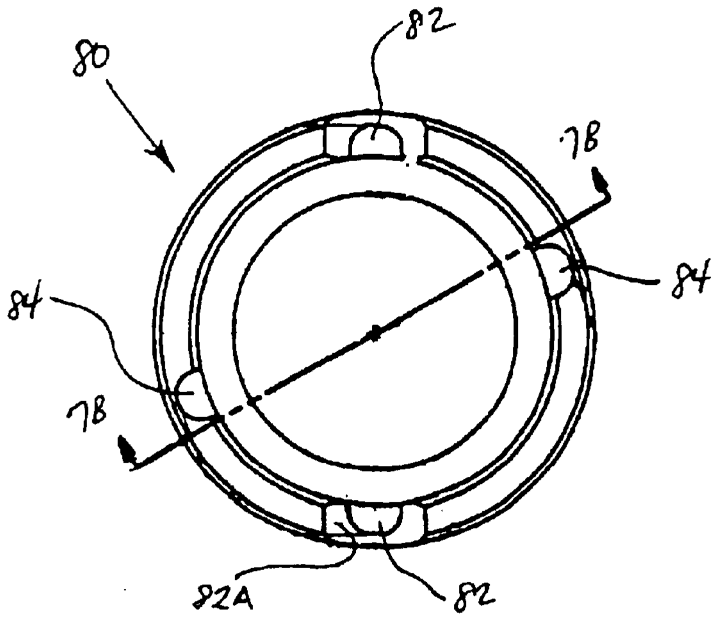
FIGS. 7A, 7B, and 7C are detail views of a lifting ring for the tool shown in FIG. 4.
Figure 7B:
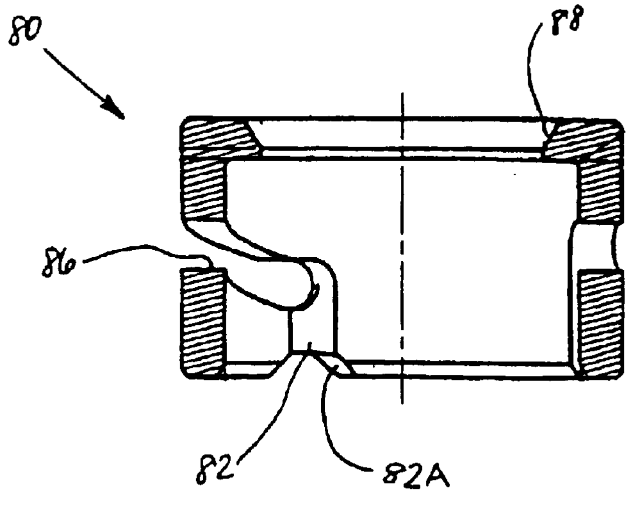
Figure 7C:
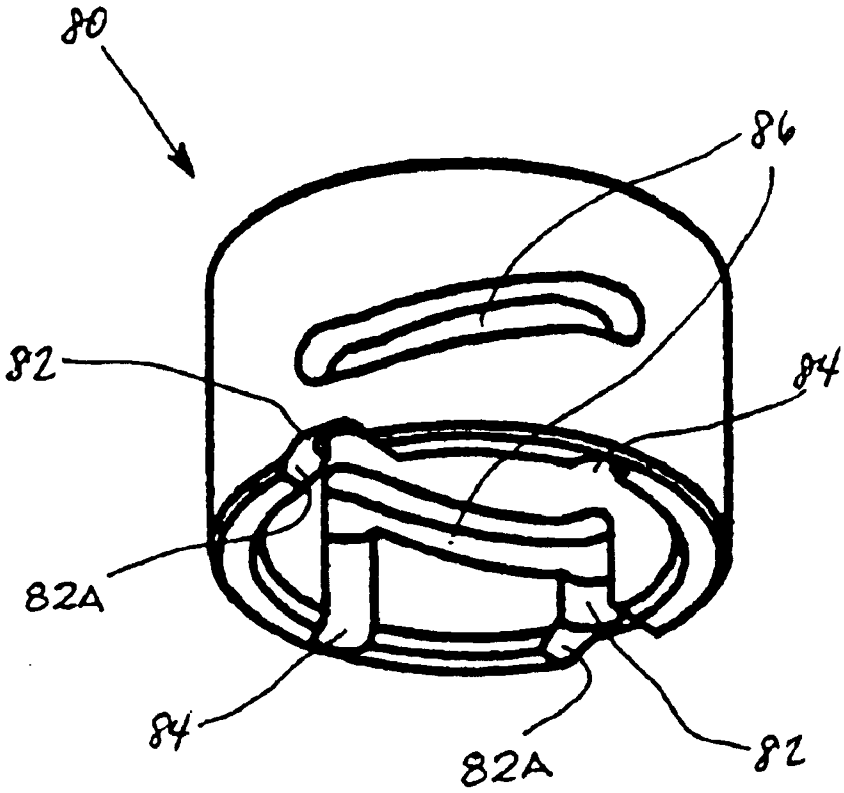

A lifting ring 80 is movably mounted around the jaw assembly, as shown in FIG. 4. The lifting ring 80 has a pair of first longitudinal grooves 82, which can each include a lead-in chamfer 82A, and a pair of second longitudinal grooves 84, as shown in FIGS. 7A–7C. The respective first and second grooves 82, 84 are connected by cam grooves 86. The lifting ring 80 can be moved to an upper longitudinal configuration on the tool 100 to allow the jaws 50 to be opened. There is an opening 88 in the upper surface of the lifting ring 80 sized to accommodate the handles 60 in the open position. When the jaws 50 are closed, the lifting ring 80 can be moved to a lower longitudinal configuration encircling the jaws 50 and the release members 70.

The operation of tool 100 will now be described. With the lifting ring 80 in the upper longitudinal configuration, the jaws 50 are opened by pivoting the handles 60 apart. The jaws 50 are then placed around the damper 20 to be removed, and the handles 60 pivoted together, closing the jaws 50. The tool 100 is secured in position on the damper 20 as the shaped internal cavity 52 in each of the jaws 50 is pressed into engagement with the outer surface of the damper 20. At this point, the release members 70 are in an extended position, with each radial pin 73 contacting the lower edge of the longitudinal groove 56B in each jaw 50, due to the biasing force of the slide springs 58 on the radial pins 73.

Next, the lifting ring 80 is moved to the lower longitudinal configuration. In order for the lifting ring 80 to be advanced over the second ends 73B of the radial pins 73, the first longitudinal grooves 82 on the lifting ring 80 must be aligned with the radial pins 73. This alignment can be facilitated by the lead-in chamfers 82A. The lifting ring 80 is advanced over the jaws 50 and release members 70 until the second ends 73B of the radial pins 73 enter the cam grooves 86 in the lifting ring 80. The lifting ring 80 is then rotated around the axis A between first and second angular orientations to effectuate axial movement of the release members 70. As the lifting ring 80 is rotated, the radial pins 73 follow the contour of the cam grooves 86 and move axially against the biasing force of the slide springs 58. As the release members 70 move axially, the inner rim 76 on each release member 70 advances into contact with the resilient fingers 42 on the retaining clip 40, forcing the fingers 42 outwardly. As the lifting ring 80 is rotated further, the release members 70 reach the point of maximum axial displacement, then the radial pins 73 reach the ends of the cam grooves 86. At the point of maximum displacement, the rims 76 on the release members 70 displace the resilient fingers 42 to an inner diameter slightly greater than the outer diameter of the retaining lip 34 on the fuel cup 32. At this point, the radial pins 73 are in alignment with the second longitudinal grooves 84 on the lifting ring 80. When this happens, the biasing force of the slide springs 58 acting on the radial pins 73 is generally opposed by the biasing force of the resilient fingers 42 acting on the release members 70. Thus, the lifting ring 80 tends to remain at this rotary position, i.e., with the radial pins 73 located at the respective intersections of the corresponding cam grooves 86 and second longitudinal grooves 84. The damper 20 can now be freed from the fuel cup 32 by displacing, e.g., pulling, the tool 100 along the axis A away from the fuel rail 30.

In order to open the jaws 50 and release the damper 20 from the tool 100, the lifting ring 80 is pulled axially toward the handles 60, i.e., such that the radial pins 73 slide along the second longitudinal grooves 84. The jaws 50 can then be opened by pivoting the handles 60 apart, and the damper 20 can be removed from the tool 100.

Throughout the axial movement of the release members 70, the guide pins 78A on the release members 70 slide in the longitudinal apertures 56A on the jaws 50 and prevent relative rotational movement between the release members 70 and the jaws 50.

Figure 8:
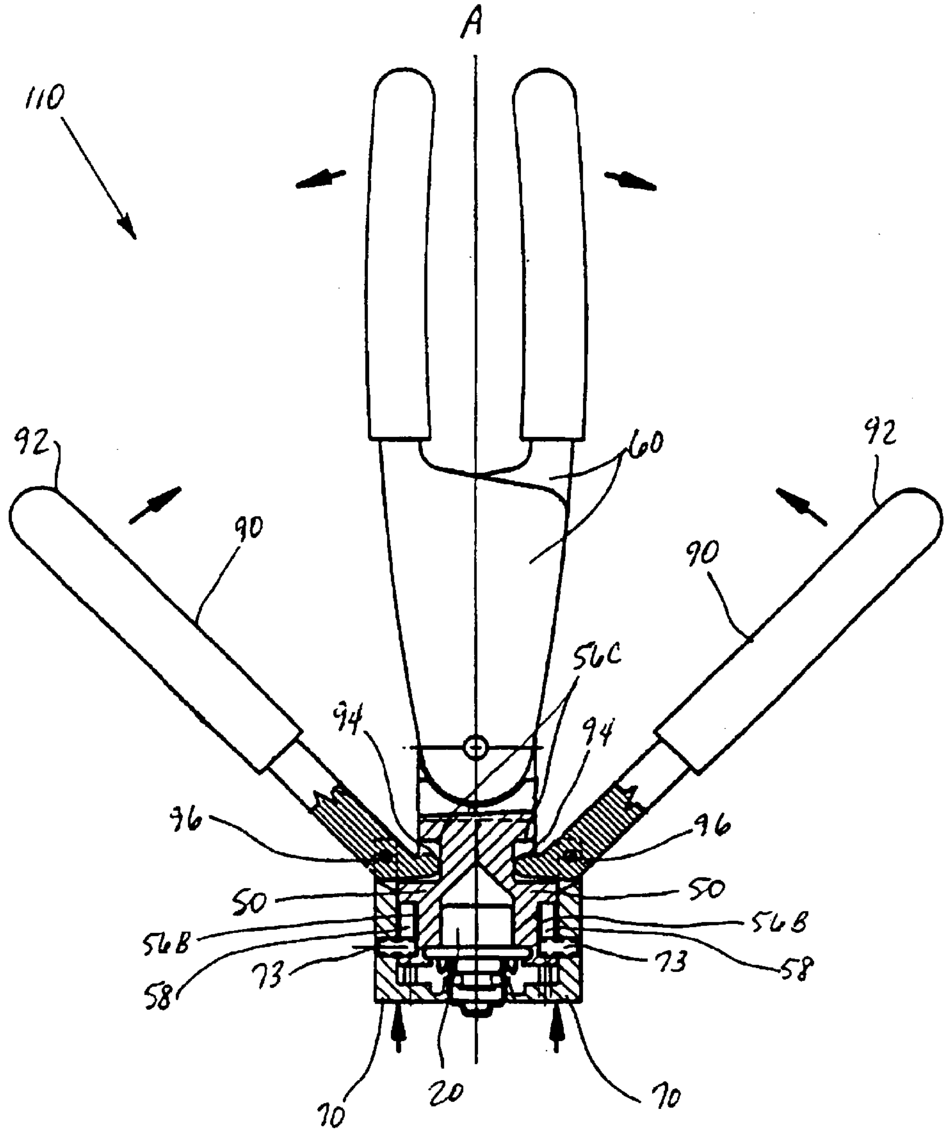
FIG. 8 is a partial cross-section view showing an alternative tool according to the present invention.

An alternative tool 110 according to the present invention is shown in FIG. 8. As shown, the lifting ring 80 is replaced by a pair of lever arms 90 which operate to move the release members 70 axially. Each lever arm 90 has a handle 92 on a first end, and a cam surface 94 on a second end. The cam surface 94 is disposed in an opening 56C on an upper surface of each jaw 50. Each cam lever 90 has a pivoting connection 96 to a respective release member 70, so that when the cam levers 90 are pivoted towards the handles 60, the release members 70 move axially. The tool 110 has a longitudinal axis A, as shown in FIG. 8.

The operation of the tool 110 now be described. As in the first embodiment, the jaws 50 are opened by pivoting the handles 60 apart. Again, the jaws 50 are placed around the damper 20, and the handles 60 are pivoted together, closing the jaws 50 and securing the tool 110 on the damper 20. At this point, the release members 70 are in an extended position, with each radial pin 73 contacting the lower edge of the longitudinal groove 56B in each jaw 50, due to the biasing force of the slide springs 58 on the radial pins 73.

Next, the lever arms 90 are pivoted towards the handles 60 to effectuate axial movement of the release members 70. When the lever arms 90 are pivoted, the cam surface 94 on the end of each lever arm 90 interacts with a corresponding opening 56C on the upper portion of each jaw 50. The pivoting motion of the lever arms 90 pulls the release members 70 axially against the biasing force of the slide springs 58. As the release members 70 move axially, the inner rim 76 on each release member 70 advances into contact with the resilient fingers 42 on the retaining clip 40, forcing the fingers 42 outwardly. As the lever arms 90 are pivoted further, the release members 70 reach the point of maximum axial displacement. At the point of maximum displacement, the rims 76 on the release members 70 displace the resilient fingers 42 to an inner diameter slightly greater than the outer diameter of the retaining lip 34 on the fuel cup 32. The damper 20 can be freed from the fuel cup 32 by displacing, e.g., pulling, the tool 110 along the axis A away from the fuel rail 30.

The lever arms 90 are then pivoted away from the handles 60, returning the release members 70 to the extended position, aided by the biasing force of the slide springs 58. The jaws 50 are then opened by pivoting the handles 60 apart, and the damper 20 is removed from the tool 110.

As in the first embodiment, throughout the axial movement of the release members 70, the guide pins 78A on the release members 70 slide in the guide apertures 56A on the jaws 50 and prevent relative rotational movement between the release members 70 and the jaws 50.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A method of releasing a retention member securing a component to a fixture, the method comprising:

providing a set of jaws adapted for gripping the component;

providing a set of release members supported for relative movement on the set of jaws;

moving the set of release members relative to the set of jaws to releasingly engage and move the retention member away from the fixture;

separating the component from the fixture; and providing a rotatable ring engaging the set of release members, wherein the moving the set of release members includes rotating the ring relative to the set of jaws.

2. A method of releasing a retention member securing a component to a fixture, the method comprising:

providing a set of jaws adapted for gripping the component;

providing a set of release members supported for relative movement on the set of jaws;

moving the set of release members relative to the set of jaws to releasingly engage and move the retention member away from the fixture;

separating the component from the fixture; and providing a set of lever arms pivotally mounted on the set of release members, wherein the moving the set of release member includes pivoting the set of lever arms relative to the set of jaws.

3. A method of releasing a retention member securing a component to a fixture, the method comprising:

providing a set of jaws adapted for gripping the component;

providing a set of release members supported for relative movement on the set of jaws;

moving the set of release members relative to the set of jaws to releasingly engage and move the retention member away from the fixture;

separating the component from the fixture; and pivoting the set of jaws relative to one another to grip the component.

4. A method of releasing a retention member securing a component to a fixture, the method comprising:

providing a set of jaws adapted for gripping the component;

providing a set of release members supported for relative movement on the set of jaws;

moving the set of release members relative to the set of jaws to releasingly engage and move the retention member away from the fixture, the moving the set of release members comprises releasably engaging and moving the retention member interposed between the component defining a female member and the fixture defining a male member; and separating the component from the fixture.

5. A method of releasing a retention member securing a component to a fixture, the method comprising:

providing a set of jaws adapted for gripping the component;

providing a set of release members supported for relative movement on the set of jaws;

moving the set of release members relative to the set of jaws to releasingly engage and move the retention member away from the fixture; and separating the component from the fixture;

wherein the providing of the set of jaws comprises a first jaw and second jaw being opposed along a first axis of the component and the set of release members comprises a plurality of slides.

6. A method of releasing a retention member securing a component to a fixture, the method comprising:

providing a set of jaws adapted for gripping the component, the set of jaws having a first jaw and second jaw being opposed along a first axis of the component and the set of release members having a plurality of slides;

pivoting the first jaw relative to the second jaw on a second axis oriented orthogonally with respect to the first axis;

providing a set of release members supported for relative movement on the set of jaws;

moving the set of release members relative to the set of jaws to releasingly engage the retention member; and separating the component from the fixture.

7. The method according to claim 6, further comprises:

providing a set of cams cooperatively engaging the set of release members; and rotating a ring on the first axis between first and second angular orientations relative to the set of jaws, wherein ring rotation from the first angular orientation to the second angular orientation moves the set of release members relative to the set of jaws from the a first position to a second position along the first axis.

8. The method according to claim 7, further comprises displacing the ring along the first axis between first and second longitudinal configurations relative to the set of jaws, the set of cams being spaced from the set of release members at the first longitudinal configuration, and the set of cams engaging the set of release members in the second longitudinal configuration, and wherein ring rotation between the first and second angular orientations occurs after the ring is displaced to the second longitudinal configuration.

9. The method according to claim 7, wherein the set of cams includes a set of lever arms, each one of the set of lever arms being pivotally supported on a corresponding one of the set of release members and having first and second portions extending in different directions from a pivot point, the first portion engaging the corresponding one of the set of jaws, and the second portion being adapted to be manipulated to move the set of release members relative to the set of jaws.

10. A method of releasing a retention member securing a component to a fixture, the method comprising:

providing a set of jaws adapted for gripping the component, the set of jaws having a first jaw and second jaw being opposed along a first axis of the component and the set of release members having a plurality of slides;

providing a set of release members supported for relative movement on the set of jaws;

biasing the set of release members toward the first position relative to the set of jaws moving the set of release members relative to the set of jaws to releasingly engage the retention member; and separating the component from the fixture.

11. The method according to claim 4, wherein the moving the set of release members includes displacing the release members parallel to an axis along which the component and the fixture commonly extend.

* * * * *